United States Patent
Wheeler et al.

(10) Patent No.: US 10,598,302 B2
(45) Date of Patent: Mar. 24, 2020

(54) SAFETY ANCHOR DEVICE FOR HIGH PRESSURE PIPE COUPLINGS

(71) Applicant: TorcSill Foundations, LLC, Pasadena, TX (US)

(72) Inventors: Aaron Wheeler, Pasadena, TX (US); Stephen Willis, Pasadena, TX (US); Jason Glassey, Pasadena, TX (US); Burk McCurdy, Jr., Pasadena, TX (US)

(73) Assignee: TORCSILL FOUNDATIONS, LLC, Pasadena, TX (US)

(*) Notice: Subject to any disclaimer, the term of this patent is extended or adjusted under 35 U.S.C. 154(b) by 22 days.

(21) Appl. No.: 15/855,615

(22) Filed: Dec. 27, 2017

(65) Prior Publication Data
US 2019/0195393 A1    Jun. 27, 2019

(51) Int. Cl.
*F16L 3/127*    (2006.01)
*F16L 3/26*    (2006.01)
*F16L 55/00*    (2006.01)

(52) U.S. Cl.
CPC ............... *F16L 3/127* (2013.01); *F16L 3/26* (2013.01); *F16L 55/005* (2013.01)

(58) Field of Classification Search
CPC . F16L 3/127; F16L 3/26; F16L 55/005; F16L 1/06; F16L 1/10; F16L 3/221; F16L 3/227
See application file for complete search history.

(56) References Cited

U.S. PATENT DOCUMENTS

| | | | | |
|---|---|---|---|---|
| 1,709,898 A | * | 4/1929 | Cunneen | F16L 1/10 248/70 |
| 2,472,654 A | * | 6/1949 | Engelke | F16L 1/10 248/49 |
| 3,055,692 A | * | 9/1962 | Kausche | A01G 25/00 294/16 |
| 3,451,711 A | * | 6/1969 | Carpenter | B66C 1/422 294/113 |
| 3,472,402 A | * | 10/1969 | Priefert | A01G 25/09 414/555 |
| 3,809,348 A | * | 5/1974 | Di Laura | F16L 3/00 248/49 |

(Continued)

FOREIGN PATENT DOCUMENTS

CN    107448689 A    12/2017
EP    1176349 B1    2/2005

OTHER PUBLICATIONS

Lee, Jong Kyung (Authorized Officer), International Search Report and Written Opinion dated Apr. 5, 2019, PCT Application No. PCT/US2018/064902, pp. 1-15.

*Primary Examiner* — Bradley Duckworth
(74) *Attorney, Agent, or Firm* — MH2 Technology Law Group LLP (57) ABSTRACT

A pipe restraint, system, and method for securing a pipeline, of which the pipe restraint includes an anchor configured to be secured to the ground, a first gripping member configured to grip a first pipe, a second gripping member configured to grip a second pipe that is connected to the first pipe, and one or more arms connected to the anchor and the first and second gripping members. The one or more arms are configured to constrain movement of the first gripping member, the second gripping member, or both with respect to the anchor.

16 Claims, 5 Drawing Sheets

(56) References Cited

U.S. PATENT DOCUMENTS

| | | | | |
|---|---|---|---|---|
| 4,993,670 A * | 2/1991 | Tesar | .................... | F16L 3/1091 |
| | | | | 248/68.1 |
| 5,022,624 A * | 6/1991 | Hill | ....................... | F16M 13/02 |
| | | | | 248/274.1 |
| 5,060,891 A * | 10/1991 | Nagy | ...................... | F16L 3/127 |
| | | | | 174/659 |
| 6,273,372 B1 * | 8/2001 | Heath | ..................... | B25B 5/006 |
| | | | | 248/317 |
| 7,621,486 B1 * | 11/2009 | Barrepski | ............... | F16L 3/127 |
| | | | | 248/228.7 |
| 7,849,819 B2 * | 12/2010 | Moreau | .................... | A01K 1/00 |
| | | | | 119/523 |
| 8,888,053 B2 * | 11/2014 | Blanchard | ................ | B64C 1/406 |
| | | | | 248/68.1 |
| 8,905,081 B2 * | 12/2014 | Lee | ....................... | F16L 55/005 |
| | | | | 138/106 |
| 9,383,039 B2 * | 7/2016 | Hirst | ...................... | F16L 3/015 |
| 9,508,472 B2 * | 11/2016 | Deshaies | ................. | H02G 3/30 |
| 9,777,870 B2 * | 10/2017 | Roth | ........................ | F16L 3/00 |
| 2003/0150963 A1 * | 8/2003 | Doring | ................... | A62C 33/04 |
| | | | | 248/76 |
| 2006/0180713 A1 | 8/2006 | Olle et al. | | |
| 2015/0337986 A1 | 11/2015 | Bouchard | | |
| 2016/0186402 A1 * | 6/2016 | Tomchesson | ........... | E02D 5/526 |
| | | | | 405/232 |
| 2016/0318244 A1 | 11/2016 | Montgomery | | |
| 2018/0145490 A1 * | 5/2018 | Guinta | ................... | F16L 3/221 |

* cited by examiner

FIG. 6

SAFETY ANCHOR DEVICE FOR HIGH PRESSURE PIPE COUPLINGS

BACKGROUND

High-pressure pipes are used in the oilfield to deliver fluids in well stimulation processes, flowback, etc., to enhance or otherwise support production of hydrocarbons from the wells. For example, the pipes may be designed to carry fluids between pumping equipment and the well. The fluids in the pipes can be at pressures exceeding 5,000 psi in some cases. The pipes are generally laid on the ground and connected together, end-to-end, using high-pressure couplings. In most cases, this assembly is effective and is employed without incident.

With such high-pressure pipelines, however, the consequences of a leak or failure in a pipe or coupling can be catastrophic. For example, a failure at a coupling can cause two pipes to decouple, sending an end of one of the pipes whipping about as a large amount of energy is released. This can pose serious risks to the safety of workers, and can potentially damage equipment.

To mitigate this risk, safety systems have been developed for these pipes. These safety systems are generally provided as a cord or cable that extends parallel to the high-pressure pipe, and is tethered to it in multiple locations. While such tethering can reduce the range of the whipping motion, the length of the pipeline that can be secured is limited by the length of the cord/cable. Further, running a cord or cable parallel to the entire length of the pipe, and then making multiple tethered connections can be time-consuming and expensive.

SUMMARY

Embodiments of the disclosure may provide a pipe restraint that includes an anchor configured to be secured to the ground, a first gripping member configured to grip a first pipe, a second gripping member configured to grip a second pipe that is connected to the first pipe, and one or more arms connected to the anchor and the first and second gripping members. The one or more arms are configured to constrain movement of the first gripping member, the second gripping member, or both with respect to the anchor.

Embodiments of the disclosure may also provide a method for securing a pipeline. The method includes securing an anchor to the ground proximal to a coupling between a first pipe and a second pipe, and coupling one or more arms to the anchor. The one or more arms extend at least partially towards the first pipe and the second pipe. The method also includes coupling a first gripping member to the first pipe, coupling a second gripping member to the second pipe, and coupling the first and second gripping members to the one or more arms, such that the first and second gripping members are coupled to the anchor via the one or more arms, so as to constrain a range of motion of the first pipe and the second pipe relative to the anchor.

Embodiments of the disclosure may further provide a pipe restraint system including a plurality of pipe restraints that are not connected together. The plurality of pipe restraints each include an anchor configured to be at least partially embedded into the ground, a first gripping member configured to grip a first pipe, a second gripping member configured to grip a second pipe that is connected to the first pipe, a first arm that is pivotally coupled to the anchor and slidably coupled to the first gripping member; and a second arm that is pivotally coupled to the anchor and slidably coupled to the second gripping member.

It is to be understood that both the foregoing general description and the following detailed description are exemplary and explanatory only and are not restrictive of the present teachings, as claimed.

BRIEF DESCRIPTION OF THE DRAWINGS

The accompanying figures, which are incorporated in and constitute a part of this specification, illustrate embodiments of the present teachings and together with the description, serve to explain the principles of the present teachings. In the figures.

DETAILED DESCRIPTION

Reference will now be made in detail to embodiments of the present teachings, examples of which are illustrated in the accompanying drawing. In the drawings, like reference numerals have been used throughout to designate identical elements, where convenient. In the following description, reference is made to the accompanying drawing that forms a part thereof, and in which is shown by way of illustration a specific exemplary embodiment in which the present teachings may be practiced. The following description is, therefore, merely exemplary.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

In general, the present disclosure provide a pipe restraint that is employable in a pipe restraint system and/or as part of a pipe restraint method, for securing a pipeline. The pipe restraint is formed, basically, from an anchor that is secured to the ground, two gripping members (e.g., clamps) that engage two pipes, near their ends and proximal to a coupling therebetween, and an arm that connects together the gripping members and the anchor. The arm and the gripping members are rigid (in comparison to a cord or cable), resisting deflection unlike a cable or cord. Further, the arm that connects together the anchor and the gripping member may be pivotable and slidable with respect to the gripping member. As such, the pipe restraint is adjustable to secure to the pipes across a range of positions, reducing the precision with which the anchor must be positioned offset from the pipes. Moreover, adjacent pipe restraints may not be connected together, and thus the pipe restraint system may be extensible for any length of pipeline, so long as an adequate number of pipe restraints are available for a desired spacing of the restraints.

Figure 1:
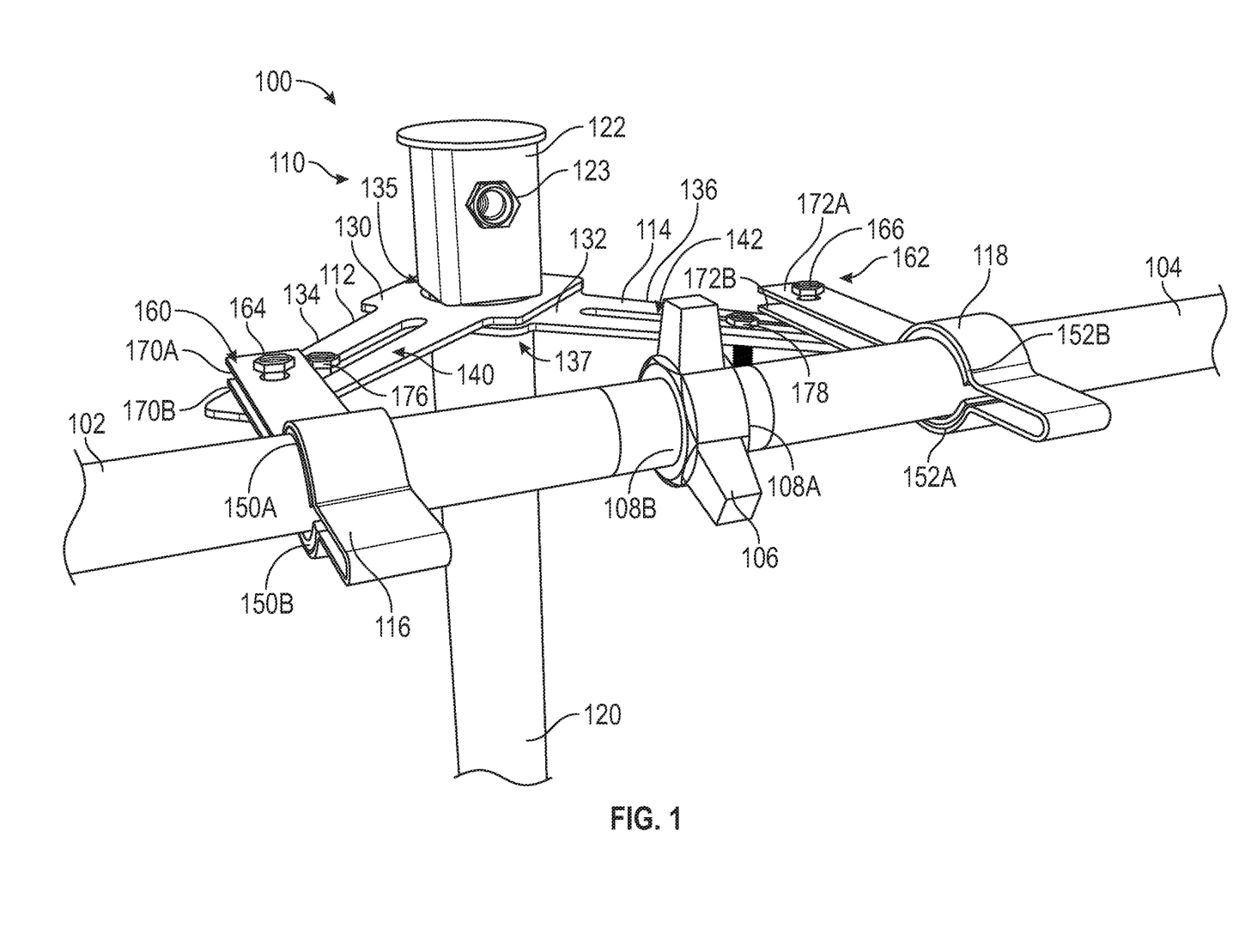
FIG. 1 illustrates a perspective view of a pipe restraint, according to an embodiment.
Figure 2:
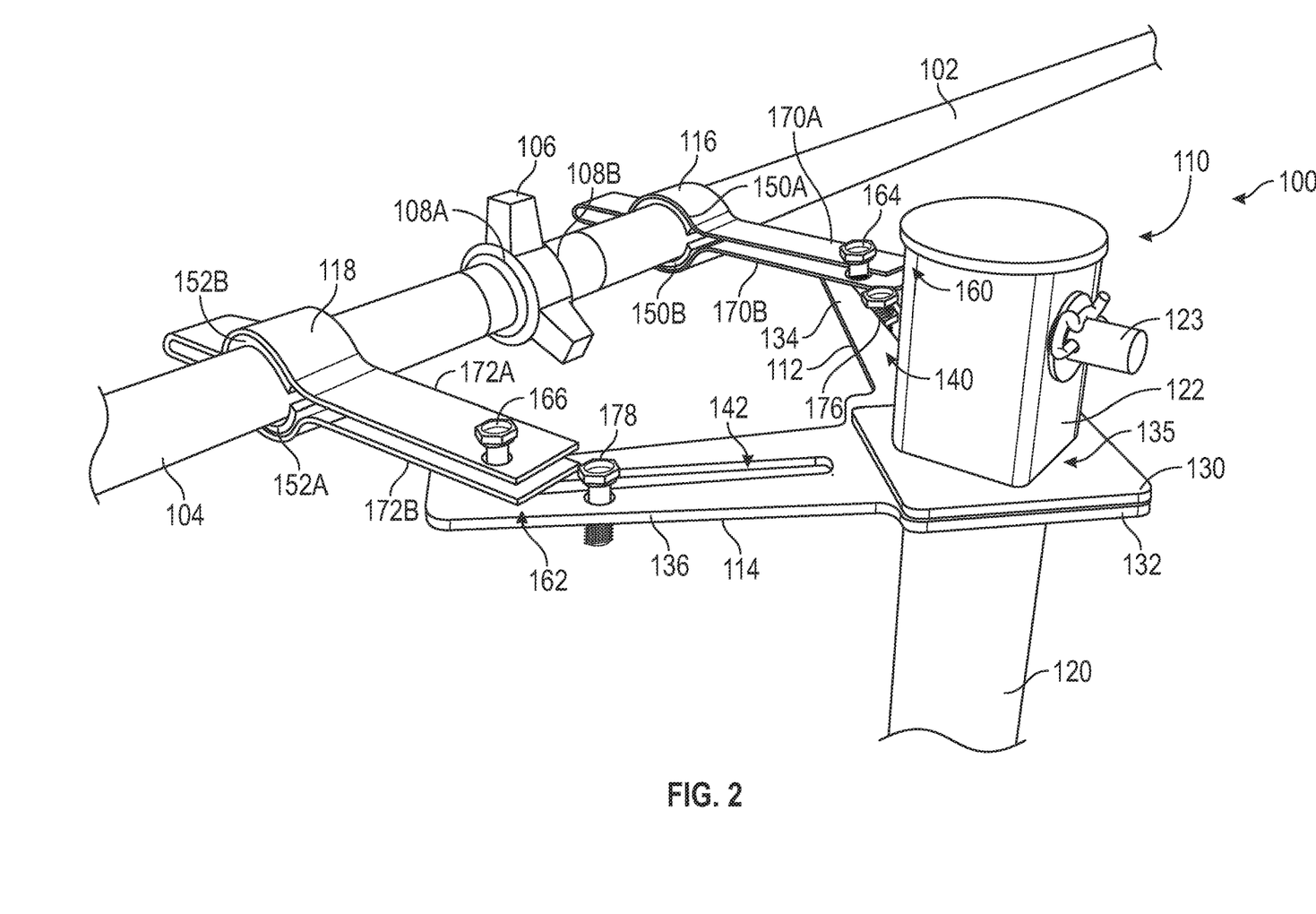
FIG. 2 illustrates another perspective view of the pipe restraint, according to an embodiment.

Turning to the illustrated examples, FIG. 1 illustrates a perspective view of a pipe restraint 100 coupled to a first pipe 102 and a second pipe 104, according to an embodiment. FIG. 2 illustrates another perspective view of the pipe restraint 100, similar to that of FIG. 1, but from a different angle, according to an embodiment. The first and second pipes 102, 104 may be connected together via a high-pressure coupling 106. For example, as shown, ends 108A, 108B of the first and second pipes 102, 104, respectively, are connected to the coupling 106, such that the pipes 102, 104 are connected together end-on-end. In other embodiments, the pipes 102, 104 may be directly connected together without a coupling therebetween, e.g., via a pin and box connection.

The pipe restraint 100 generally includes an anchor 110, one or more arms (two shown: 112, 114), a first gripping member 116, and a second gripping member 118. Beginning with the anchor 110, the anchor 110 may be secured to the ground, e.g., on which the pipes 102, 104 may be laid; however, in some embodiments, the pipes 102, 104 may be positioned off the ground, as will be described below. In an embodiment, the anchor 110 may be a pile assembly, including a pile 120 that is embedded within the ground, and a cap 122 secured to the top of the pile 120. The cap 122 may be secured to the pile 120 via a suitable fastener 123 (e.g., a bolt or pin), or via welding, adhesives, or any other suitable connection device or process. The pile assembly may be configured to resist lateral or vertical movement with respect to the ground, and an example of such a pile assembly may include one or more helical blades designed to be drilled into the ground. An example of such a "helical pile assembly" is disclosed in U.S. Patent Publication No. 2016/0186402, which is incorporated herein by reference in its entirety to the extent not inconsistent with the present disclosure. The helical pile assembly is just one example, however, and in other embodiments, the anchor 110 may be any sort of device that resists movement with respect to the ground, including, for example, a weight, a post, etc.

In the illustrated embodiment, the arms 112, 114 each include a base 130, 132, respectively, and an extension 134, 136, respectively. The bases 130, 132 may each include a hole 135, 137 formed therein, which may allow for the base 130, 132 to be received around the pile 120. As such, the arms 112, 114 may be pivotal with respect to the pile 120 and/or with respect to one another. The holes 135, 137 may, however, be smaller than the cap 122, and thus the cap 122 may prevent from arms 112, 114 from sliding off of the pile 120. The arms 112, 114 may also each include a slot 140, 142 extending along the length of the extensions 134, 136. The slots 140, 142 may have closed ends, as shown.

The arms 112, 114 may be formed from any suitably-rigid material, such as metal (e.g., steel) or a composite material (e.g., fiber-reinforced polymer). Furthermore, although two arms 112, 114 are illustrated, embodiments with a single arm or three or more arms are contemplated herein. Additionally, as the term is used herein "one or more arms connected to the first and second gripping members" should be construed to include embodiments in which a single arm connects to both the first and second gripping members, and to embodiments in which the one or more arms including a first arm connected to the first gripping member and a second arm connected to the second gripping member (and potentially third, fourth, fifth, etc. arms connected to any of the first, second, or other gripping members).

The first and second gripping members 116, 118 may each be formed as a clamp, as shown, configured to be received around and secured to the pipe 102, 104. In an embodiment, the first and second gripping members 116, 118 may be made from any suitably rigid material, such as metal (e.g., steel) or a composite material (e.g., fiber-reinforced polymer). In an embodiment, the first and second gripping members 116, 118 may include one or more anti-abrasion pads (e.g., two each: 150A, 150B, 152A, 152B), which may be made from a material that is softer than the pipe 102, 104, e.g., plastic, polymers such as polytetrafluoroethylene (TEFLON®), rubber, brass, etc. The anti-abrasion pads 150A, 150B, 152A, 152B may also serve as a shim, and may be formed in different thicknesses to allow for pipes of a range of different diameters to be engaged by one size of clamp. The first and second gripping members 116, 118 may be formed as a single-piece clamp, as shown, that may be elastically deformed to fit over the pipe 102, 104, or may be formed from two separate, generally arcuate members that are connected together at their ends.

The first and second gripping members 116, 118 may each include a proximal end 160, 162 opposite from the pipes 102, 104, respectively, which may include a connecting member 164, 166, e.g., a bolt or pin, received therethrough. The connecting member 164, 166 may be received into the corresponding slot 140, 142 of the arms 112, 114. The connecting member 164, 166 may be slidable within the slot 140, 142, or may, for example, be tightened in the slot 140, 142 and prevented from translation therein. For example, the proximal ends 160, 162 may each include two fingers 170A, 170B, 172A, 172B. In an embodiment, both fingers 170A, 170B and 172A, 172B may be positioned on one side of the corresponding arm 112, 114, with the connecting member 164, 166 received therethrough. In another embodiment, the arm 112 may be sandwiched between the fingers 170A, 170B and the arm 114 may be sandwiched between the fingers 172A, 172B.

In at least one embodiment, an optional lock member 176, 178 may be included in either or both slots 140, 142. The lock member 176, 178 may be secured to the arm 112, 114 within the slot 140, 142 and configured to limit a range of motion of the connecting member 164, 166, and thus the gripping member 116, 118 with respect to the arm 112, 114.

The pivoting of the arms 112, 114 with respect to either or both of the pile 120 and the gripping members 116, 118 may provide an amount of flexibility for the positioning of the pile assembly with respect to the pipes 102, 104. That is, the arms 112, 114 and gripping members 116, 118 may be generally rigid so as to securely prevent the aforementioned whipping of the ends 108A, 108B of the pipes 102, 104; however, by allowing the arms 112, 114 to pivot, the connection between pile assembly and the pipe 102, 104 via the arms 112, 114, and the gripping members 116, 118 can be made across a range of lateral distances—the distance between the pile 120 and the pipe 102, 104 may not have to be precise, which can facilitate installation.

Accordingly, the pivoting of the rigid arms 112, 114 and the gripping members 116, 118 may allow a small range of motion for the pipes 102, 104, but may provide rigid stops for this range of motion. Further, the rigid arms 112, 114 may be movable vertically between the ground and the cap 122, but may prevent further motion of the pipes 102, 104 that would cause the arms 112, 114 to move beyond this range. As such, the freedom of motion for the pipes 102, 104 to whip during a leak or other failure event is greatly attenuated. Moreover, there is no limit to the length of pipeline that a system of such pipe restraints 100 can be used to support, unlike a cord or cable of fixed length, additional pipe restraints 100 can be added and secured to additional segments of pipe. Additionally, when use of the pipe restraints 100 is no longer called for, the gripping members 116, 118 and the arms 112, 114 can be disconnected from one another and from the anchor 110, and the anchor 110 can be removed and used again at another site. Furthermore, each of the pipe restraints 100 independently supports the pipes 102, 104, e.g., rather than being strung or otherwise connected together.

Figure 3:
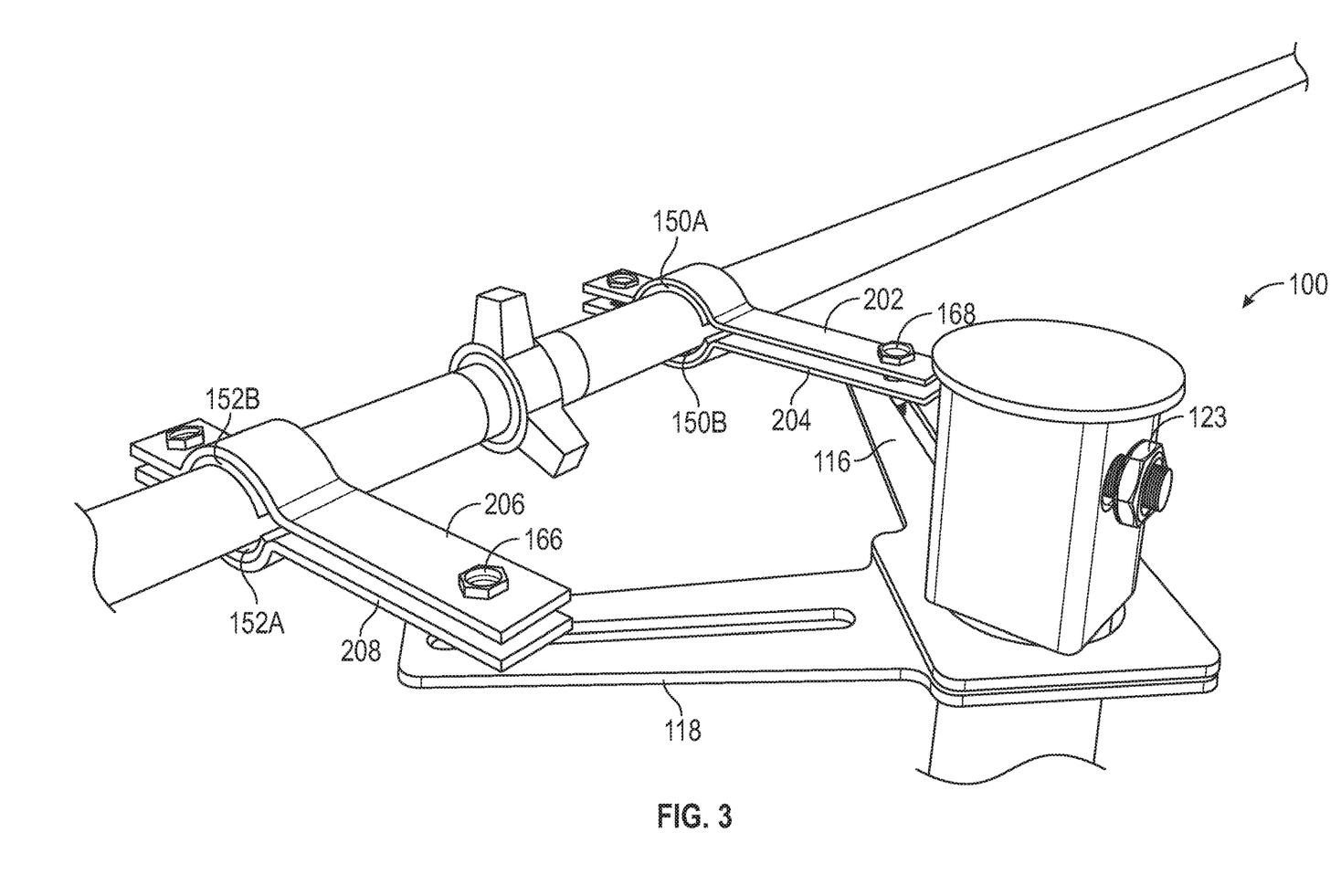
FIG. 3 illustrates a perspective view of another embodiment of the pipe restraint.

FIG. 3 illustrates a perspective view of another embodiment of the pipe restraint 100. The embodiment of FIG. 3 may be similar to that of FIGS. 1 and 2, and duplicative descriptions are omitted. However, as shown in FIG. 3, the fastener 123 may be a bolt, rather than the pin illustrated in FIGS. 1 and 2. Furthermore, the lock members are omitted from this embodiment. Additionally, the gripping members 116, 118 are formed from two bracket members 202, 204 and 206, 208, respectively, which may take the place of the fingers of FIGS. 1 and 2. The bracket members 202, 204 and 206, 208 may be fastened or otherwise connected together at their ends, as shown, and, in some embodiments, the anti-abrasion pads 150A, 150B, 152A, 152B may be positioned therebetween. In an embodiment, the connecting members 164, 168 may connect together the two bracket members 202, 204 and 206, 208 of the gripping members 116, 118, respectively, as well as connecting the gripping members 116, 118 to the respective arms 112, 114, but in other embodiments, one or more separate connecting members (e.g., fasteners, clamps, etc.) may be provided.

Figure 4:
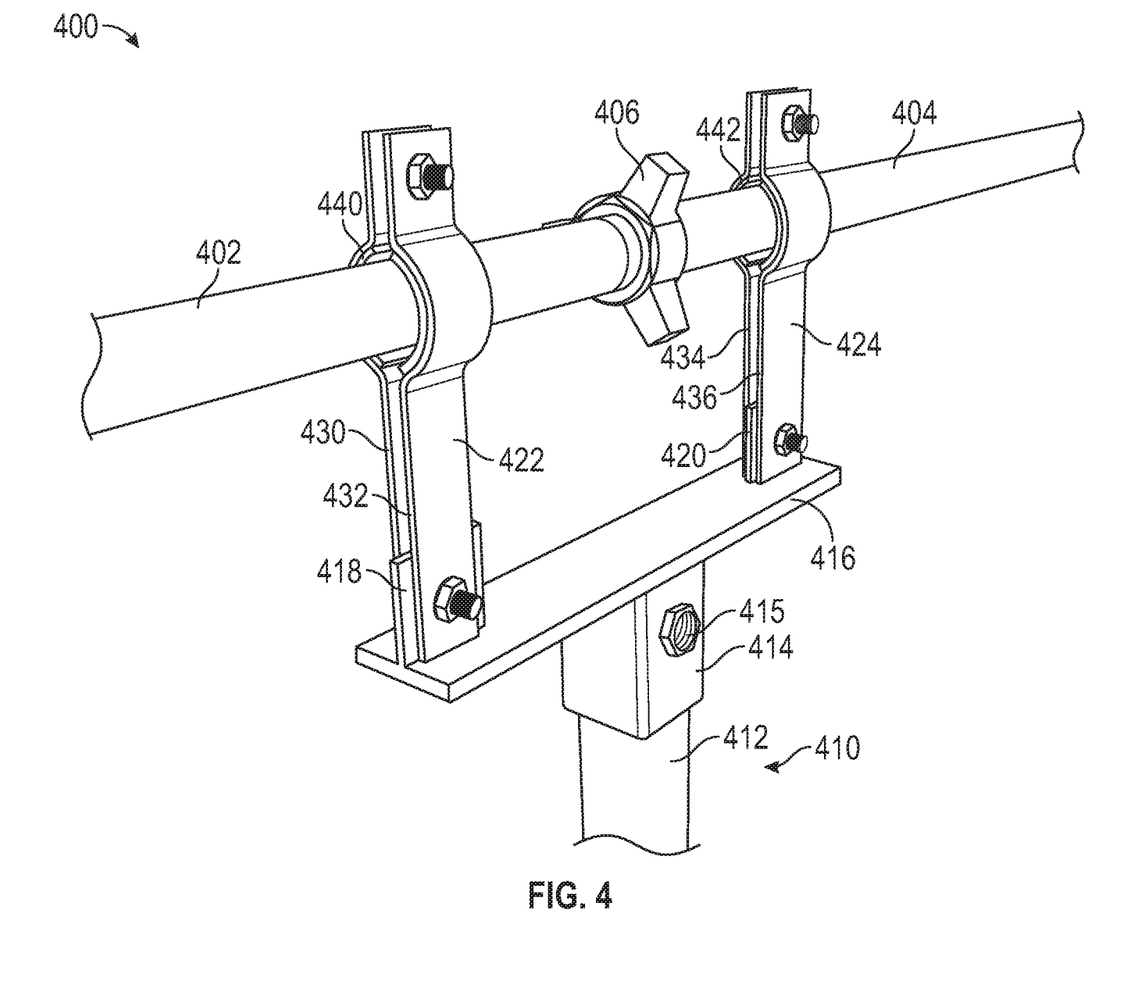
FIG. 4 illustrates a perspective view of another embodiment of the pipe restraint.

FIG. 4 illustrates a perspective view of a pipe restraint 400, according to an embodiment. The pipe restraint 400 may be similar to the embodiments of the pipe restraint 100 discussed above, but with several differences. For example, the pipe restraint 400 may be configured to grip and restrain two pipes 402, 404 joined together, end-to-end, by a coupling 406. The pipes 402, 404 may be held above the ground by the pipe restraint 400 and/or by another support structure. Thus, the pipe restraint 400 may, in an embodiment, extend vertically upwards from the ground.

The pipe restraint 400, in the illustrated embodiment, includes an anchor 410, which, in an embodiment, may be or include a weight, a post, a pile (as shown: 412), or another structure that is configured to support the loads that may be expected to restrain the pipes 402, 404 and prevent whipping of the ends thereof. The pipe restraint 400 may include a cap 414 secured to the pile 412 by a fastener 415 such as a bolt or pin, or via welding, etc.

An arm 416 may be coupled to the cap 414, e.g., by fastening, welding, or integral formation therewith. In other embodiments, the arm 416 may be secured elsewhere to the pile 412 or another part of the anchor 410. The arm 416 may extend parallel to the pipes 402, 404, e.g., to a length sufficient to span the coupling 406. The arm 416 may include tabs 418, 420 proximal to opposite ends of the arm 416. The tabs 418, 420 may extend vertically upwards, for example, as shown. In other embodiments, the tabs 418, 420 may extend in at any orientation with respect to the ground.

The pipe restraint 400 may include two (or more) gripping members 422, 424, which may be connected to the arm 416, e.g., at the tabs 418, 420. For example, the gripping members 422, 424 may be secured pivotally to the tabs 418, 420 using connecting members 426, 428 such as bolts, as shown.

The gripping members 422, 424 may be single-piece clamps, or as shown, may be formed from two bracket members 430, 432 and 434, 436, respectively, which are connected together proximal to their ends. The gripping members 422, 424 may thus be secured to the pipes 402, 404, e.g., by securing the bracket members 430, 432 and 434, 436 together. In an embodiment, the gripping members 422, 424 may extend substantially vertically from anchor 410, but in other embodiments, may extend horizontally or in any orientation between vertical and horizontal. In an embodiment, the arm 416 and the gripping members 422, 424 may be unitary, rather than coupled together pivotally, and may thus form a generally U-shaped bracket configured to grip the pipes 402, 404 on either side of the coupling 406. Anti-abrasion pads 440, 442 may be positioned between the respective gripping members 422, 424 and the pipes 402, 404.

Figure 5:
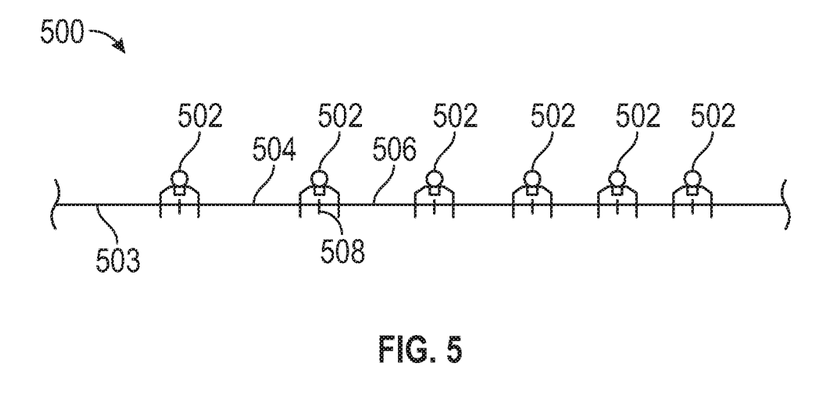
FIG. 5 illustrates a simplified, schematic view of a pipe restraint system, according to an embodiment.

FIG. 5 illustrates a simplified view of a pipe restraint system 500, according to an embodiment. The pipe restraint system 500 includes several, potentially dozens or even hundreds of, pipe restraints 502. The pipe restraints 502 may be representative of one or more of the pipe restraint 100, 400 embodiments discussed above. As shown, the pipe restraints 502 each grip a pipeline 503, e.g., each pipe restraint 502 grips two pipes, e.g., pipes 504, 506, that are connected together by a coupling 508. The individual pipe restraints 502 are not connected together, apart from their mutual connection with the pipeline 503. Accordingly, if one of the couplings 508 fails, the pipes 504, 506 are restrained from whipping about as high-pressure fluid escapes by the respective pipe restraints 502.

Figure 6:
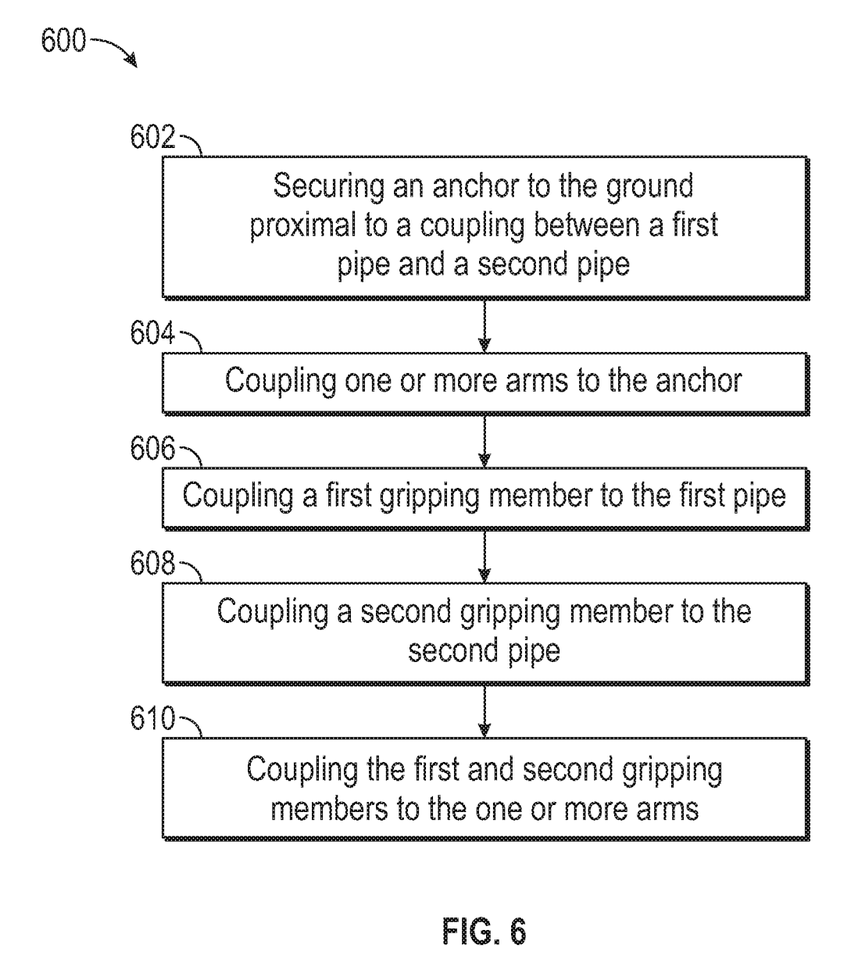
FIG. 6 illustrates a flowchart of a method for restraining a pipeline, according to an embodiment.

FIG. 6 illustrates a flowchart of a method 600 for securing a pipeline, according to an embodiment. The method 600 may proceed by operation or installation of one or more embodiments of the pipe restraint 100 or 400, discussed above, and will be described herein with reference to the pipe restraint 100; however, it is to be understood that this is merely one example implementation of the method 600. Furthermore, it will be appreciated that any of the following steps may be performed in any order and/or certain steps may be executed simultaneously or broken apart into two steps, without departing from the scope of the present disclosure.

The method 600 may include securing an anchor 110 of the pipe restraint 100 to the ground proximal to a coupling 106 between a first pipe 102 and a second pipe 104, as at 602. For example, securing at 602 may include embedding a pile 120 into the ground, e.g., by drilling the pile 120 into the ground, as the pile 120 may be a helical pile.

The method 600 includes coupling one or more arms (e.g., arms 112, 114) to the anchor 110, as at 604. The one or more arms 112, 114 may extend at least partially towards the first pipe 102 and the second pipe 104, e.g., laterally and/or vertically.

The method 600 includes coupling a first gripping member 116 to the first pipe 102, as at 606. The method 600 further includes coupling a second gripping member 118 to the second pipe 104, as at 608. In an embodiment, the one or more arms 112, 114 are pivotally coupled to the pile 120 of the anchor 110.

The method 600 includes coupling the first and second gripping members 116, 118 to the one or more arms 112, 114, as at 610. In an embodiment, the one or more arms 112, 114 may include a first arm 112 that is coupled the first gripping member 116 and a second arm 114 that is coupled to the second gripping member 118. Coupling the first and second gripping members 116, 118 may thus include slidably coupling the first gripping member 116 to the first arm 112 and slidably coupling the second gripping member 118 to the second arm 114. For example, connecting members 164, 166 may be received through proximal ends 160, 162 of the gripping members 116, 118 and into slots 140, 142 defined in the arms 112, 114. The connecting members 164, 166 may be free to slide in the slots 140, 142, thereby slidably coupling the gripping members 116, 118 to the arms 112, 114, while also allowing for pivoting motion of the arms 112, 114 relative to the gripping members 116, 118 and the pile 120.

While the present teachings have been illustrated with respect to one or more implementations, alterations and/or modifications may be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A pipe restraint, comprising:
    an anchor configured to be at least partially embedded into and secured to the ground;
    a first gripping member configured to grip a first pipe;
    a second gripping member spaced apart from and aligned with the first gripping member, such that the second gripping member is configured to grip a second pipe that is connected to the first pipe, the first and second pipes being generally concentric;
    a first arm connected to the anchor and the first gripping member, wherein the first arm is configured to constrain movement of the first gripping member with respect to the anchor, wherein the first arm is received around the anchor so as to be pivotal with respect thereto; and
    a second arm connected to the anchor and the second gripping member, wherein the second arm is configured to constrain movement of the second gripping member with respect to the anchor, wherein the second arm is received around the anchor so as to be pivotal with respect thereto.

2. The pipe restraint of claim 1, wherein the anchor comprises a helical pile assembly that is configured to be drilled into the ground.

3. The pipe restraint of claim 1, wherein the first and second arms are pivotal with respect to one another.

4. The pipe restraint of claim 3, wherein the first arm defines a first slot and the second arm defines a second slot, wherein the first gripping member comprises a first fastener configured to be received into the first slot such that the first gripping member is pivotal and slidable with respect to the first arm, and wherein the second gripping member comprises a second fastener configured to be received into the second slot such that the second gripping member is pivotal and slidable with respect to the second arm.

5. The pipe restraint of claim 4, further comprising:
    a first lock member received into the first slot of the first arm and configured to restrict a range of motion of the first fastener in the first slot; and
    a second lock member received into the second slot of the second arm and configured to restrict a range of motion of the second fastener in the second slot.

6. The pipe restraint of claim 4, wherein the anchor comprises a pile and a cap secured to an end of the pile, the first and second arms being positioned around the pile and prevented from sliding off the pile by the cap.

7. The pipe restraint of claim 1, wherein the first and second gripping members each include a clamp configured to be secured to the first pipe or the second pipe.

8. The pipe restraint of claim 1, wherein the first and second gripping members are spaced apart such that the first and second gripping members are configured to grip the first and second pipes, respectively, on either side of a pipe coupling that is positioned between and connects together a first end of the first pipe and a first end of the second pipe.

9. The pipe restraint of claim 1, wherein the pipe restraint is configured to be coupled to the first and second pipes without being coupled to another pipe restraint.

10. The pipe restraint of claim 1, wherein the first and second arms extend laterally away from the anchor and are pivotal in a first horizontal plane with respect thereto, and the first and second gripping members extend laterally from the first and second arms and are pivotal in a second horizontal plane with respect thereto, such that, when the first pipe or the second pipe applies a vertical force on the first gripping member or the second gripping member, the vertical force applies a torque force to the anchor via the first and second arms, and wherein the anchor is configured to transmit the torque force directly to the ground substantially without displacement.

11. A method for securing a pipeline, the method comprising:
    securing an anchor to the ground proximal to a pipe coupling between a first pipe and a second pipe, the first and second pipes being connected together, end-to-end, by the pipe coupling, such that the first and second pipes are generally concentric, wherein securing the anchor comprises at least partially embedding a pile into the ground;
    coupling a first arm and a second arm to the anchor by receiving the first and second arms around the anchor, such that the first and second arms are pivotal about the anchor, wherein the first and second arms extend at least partially towards the first pipe and the second pipe;
    coupling a first gripping member to the first pipe;
    coupling a second gripping member to the second pipe, the second gripping member being spaced apart from and aligned with the first gripping member; and
    coupling the first and second gripping members to the first and second arms, respectively, such that the first and second gripping members are coupled to the anchor via the first and second arms, respectively so as to constrain a range of motion of the first pipe and the second pipe relative to the anchor.

12. The method of claim 11, wherein coupling the first and second gripping members to the first and second arms, respectively, comprises slidably coupling the first gripping member to the first arm and slidably coupling the second gripping member to the second arm.

13. The method of claim 12, further comprising sliding the first arm relative to the first gripping member, such that an end of the first gripping member moves along a length of the first arm, while pivoting the first arm relative to the pile, and sliding the second arm relative to the second gripping member, such that an end of the second gripping member moves along a length of the second arm, while pivoting the second arm relative to the pile.

14. The method of claim 13, further comprising, after sliding the first arm, restraining the first arm from sliding, and after sliding the second arm, restraining the second arm from sliding.

15. A pipe restraint system comprising:
  a plurality of pipe restraints each comprising:
    an anchor configured to be at least partially embedded into the ground;
    a first gripping member configured to grip a first pipe;
    a second gripping member spaced apart from and aligned with the first gripping member, the second gripping member being configured to grip a second pipe that is connected to the first pipe end-to-end, such that the first and second pipes are concentric;
    a first arm that is received around and pivotally coupled to the anchor and linearly slidably and pivotally coupled to the first gripping member; and
    a second arm that is received around and pivotally coupled to the anchor and linearly slidably and pivotally coupled to the second gripping member, wherein the plurality of pipe restraints are coupled to a line of pipes including the first and second pipes and not otherwise coupled together.

16. The pipe restraint system of claim 15, wherein the anchor comprises a pile embedded into the ground.

\* \* \* \* \*